United States Patent
Freeman et al.

(10) Patent No.: US 6,949,232 B2
(45) Date of Patent: Sep. 27, 2005

(54) PRODUCING COBALT (III) HEXAMMINE SULFATE FROM NICKEL COBALT SULFIDES

(75) Inventors: Gavin Kerry Wyllie Freeman, Calgary (CA); Ockert Gerbrandt Pauw, Albert (CA); Russell Peter Kofluk, Opal (CA); James John Budac, Sherwood Park (CA)

(73) Assignee: Sherritt International Corporation, Fort Saskatchewan (CA)

( * ) Notice: Subject to any disclaimer, the term of this patent is extended or adjusted under 35 U.S.C. 154(b) by 419 days.

(21) Appl. No.: 10/157,915

(22) Filed: May 31, 2002

(65) Prior Publication Data

US 2003/0223928 A1 Dec. 4, 2003

(51) Int. Cl.⁷ .............................................. C22B 23/00
(52) U.S. Cl. ...................... 423/141; 423/142; 423/143; 423/145; 423/388
(58) Field of Search ................ 423/141, 142, 423/143, 145, 388

(56) References Cited

U.S. PATENT DOCUMENTS

| | | | |
|---|---|---|---|
| 2,694,005 A | 11/1954 | Schaufelberger | |
| 2,694,006 A | 11/1954 | Schaufelberger et al. | |
| 2,728,636 A | 12/1955 | Van Ilare, Jr. et al. | |
| 2,767,054 A | 10/1956 | Schaufelberger | |
| 2,767,055 A | 10/1956 | Schaufelberger | |
| 2,822,264 A | 2/1958 | Benoit et al. | |
| 3,227,513 A | 1/1966 | Alexa et al. | |
| 3,751,558 A | 8/1973 | Crnojevich et al. | |
| 3,967,957 A | 7/1976 | Fonseca | |
| 4,208,380 A | 6/1980 | Hamalainen et al. | |
| 5,468,281 A | 11/1995 | Kerfoot | |
| 6,267,800 B1 * | 7/2001 | Freeman | 75/711 |

FOREIGN PATENT DOCUMENTS

| | | |
|---|---|---|
| CA | 1147970 | 6/1983 |
| DE | 595688 | 3/1934 |

OTHER PUBLICATIONS

"The Winning of Nickel", J.R. Boldt, Jr. (Ed), Toronto, Longmans, Canada Limited, 1967, pp. 229 to 314.
Chemical Engineering, Sep. 7, 1959, p. 145.

* cited by examiner

Primary Examiner—Steven Bos
(74) Attorney, Agent, or Firm—Arne I. Fors

(57) ABSTRACT

There is provided an improvement in a process for producing cobalt (III) hexammine sulphate which process comprises oxidatively pressure leaching nickel cobalt sulphides in an ammoniacal ammonium sulphate solution. The nickel and cobalt sulphides are oxidized to sulphates, and an ammoniacal leach liquor in which dissolved cobalt is predominantly in the (III) oxidation state is produced. The ammoniacal leach liquor is combined with ammonia to precipitate the triple salt of cobalt (III) hexammine sulphate, nickel (II) hexammine and ammonium sulphate which is further treated to produce a crystalline cobalt (III) hexammine sulphate and a nickel enriched leach liquor. The improvement involves the provision of a second oxidative pressure treatment effective to maximize the formation of the desired cobalt (III) hexammine ion, prior to the triple salt precipitation step.

5 Claims, 2 Drawing Sheets

PRODUCING COBALT (III) HEXAMMINE SULFATE FROM NICKEL COBALT SULFIDES

BACKGROUND OF THE INVENTION (i) Field of the Invention

The invention relates to an improved hydrometallurgical process for the recovery of cobalt and nickel from nickel cobalt sulphides. More specifically, the invention relates to the separation of cobalt and nickel from an ammoniacal leach liquor to produce a substantially nickel-free cobaltic hexammine sulphate-containing solution wherein the formation of cobalt (III) hexammine sulphate ($[Co(NH_3)_6]_2(SO_4)_3$) has been optimized from which overall enhanced recovery and increased production rate of high purity cobalt metal may be obtained.

(ii) Description of the Related Art

A hydrometallurgical process for the treatment of nickel-cobalt-copper sulphide concentrates and mattes to produce high grade nickel and cobalt powders has been in commercial operation for many years. In this process, which is described in the publication, "The Winning of Nickel", J. R. Boldt, Jr. (Ed), Toronto, Longrnans, Canada Limited, 1967, pages 299 to 314, the nickel sulphide feed materials are leached in ammoniacal ammonium sulphate solution, under elevated air pressure, in horizontal autoclaves. The metals, nickel, cobalt and copper are dissolved as metal ammine complex ions. Iron is oxidized to insoluble haematite, and sulphide sulphur is partially oxidized to form a range of unsaturated sulphur anions which remain in the leach solution. The haematite residue is filtered off and discarded, and the leach solution is treated to remove copper, to partially remove the ammonia, and to oxidize the sulphur anions to sulphate. The purified solution, which contains about 60 g/L Ni and 1 g/L Co, is then treated with hydrogen under elevated pressure and temperature to precipitate nickel selectively as the metal powder. The cobalt remains in the reduced solution which contains about 1 g/L Ni and 1 g/L Co. The residual metals are then precipitated using hydrogen sulphide to produce a mixed nickel cobalt sulphide which is recycled as a feed to the cobalt refining process.

The recovery of cobalt, in this nickel refining process, is much lower than that of nickel, as a result of the adsorption of cobalt, by the iron oxide leach residue. Furthermore, the selectivity of the reduction process, for nickel, depends on the maintenance of a low level of cobalt in the purified leach solution. It is only possible to produce nickel powder meeting the market specifications for cobalt in the nickel, if the Ni:Co mass ratio is maintained above about 20:1 in the feed to the nickel reduction process. It will be appreciated, therefore, that this nickel refining process is not economically effective for the treatment of nickel feed materials with high cobalt content, since significant losses of cobalt to the leach residue and to the nickel powder product will be incurred.

A commercial cobalt refining process based on the soluble cobaltic pentammine process for separating nickel from cobalt, is operated in conjunction with the above nickel refining process. This process is based on U.S. Pat. Nos. 2,694,005; 2,694,006; 2,767,054 and 2,767,055 to Schaufelburger. In the refining process mixed nickel-cobalt sulphides with a typical Ni:Co ratio of 1:1 are first leached at elevated air pressure and temperature in dilute sulphuric acid solution to dissolve the nickel and cobalt and oxidize the sulphide to sulphate. The acidic leach solution, containing cobalt and nickel sulphates, is purified to remove iron and trace metals such as Cu, Cd and Zn. Ammonia is then added to neutralize the free acid and to adjust the ammonia to metals mole ratio to form the pentammine ions of divalent nickel and cobalt. The solution is then treated with air under pressure in an autoclave, to oxidize the cobalt (II) pentammine ion to the cobalt (III) pentammine ion. The nickel (II) pentammine ion is not oxidized under these conditions. The oxidized solution is then treated in a two-stage process with concentrated sulphuric acid to selectively precipitate nickel as the nickel ammonium sulphate double salt ($NiSO_4(NH_4)_2SO_4$), leaving cobalt (III) pentammine sulphate in solution. After the second stage of nickel removal, the cobaltic solution is essentially nickel-free, with a Co:Ni ratio greater than 1000:1. The cobalt (III) ion is reduced to cobalt (II) and acid is added to adjust the $NH_3$:Co mole ratio to about 2:1. This solution is treated with hydrogen at elevated temperature and pressure to produce cobalt metal powder containing less than 0.1% Ni. This two-stage process, as described in U.S. Pat. No. 2,822,264, produces cobalt powder with a Co:Ni ratio of greater than 1000:1.

This cobalt-nickel separation process is designed to treat mixed nickel-cobalt sulphides with Ni:Co ratios of about 1:1. As the nickel content of the sulphide increases the process becomes less viable both technically and economically, since the amount of nickel double salt to be precipitated and recycled to the nickel circuit increases, whilst the cobalt concentration in the purified solution decreases. In practice, a Ni:Co ratio of about 3:1 is the maximum that can be handled in this process. It will be appreciated, therefore, that neither of the above-described existing nickel-cobalt sulphide refining processes is suitable for the treatment of nickel-cobalt sulphides with Ni:Co weight ratios in the range 3:1 to 20:1.

When iron-containing nickel laterite ores are treated by high temperature sulphuric acid pressure leaching, the dissolved nickel and cobalt are both recovered in high yields as a mixed sulphide typically containing about 55% Ni and 5% Co, i.e. with a Ni:Co ratio of about 10:1. This process is expected to become increasingly important economically in the future as the nickel mining industry switches to the treatment of laterite ores, as economically viable sulphide ore reserves are depleted. Mixed sulphide material of this composition cannot be treated economically by any of the existing hydrometallurgical processes described supra.

Several methods of refining mixed nickel-cobalt sulphides of this type have been proposed in recent years, although none is known to have been commercialized successfully. A process described in Chemical Engineering, Sep. 7, 1959, page 145, included an acidic pressure leach to oxidize nickel and cobalt sulphides to the corresponding sulphates, solution purification to remove iron, aluminium, copper, lead and zinc, and selective reduction of nickel with hydrogen. However, since the cobalt content of the solution fed to the nickel reduction operation was about 5 g/L, excessive contamination of the nickel powder with cobalt was unavoidable, and the nickel powder thus produced would not meet current market cobalt specifications.

This problem was addressed in U.S. Pat. No. 3,751,558, which proposed a method of selectively precipitating cobalt (II) from the acid leach liquor produced by the pressure leaching of nickel-cobalt sulphides. In this process, a predetermined amount of ammonia was added to the acidic solution, at low temperature to precipitate a basic cobalt sulphate. The product solution typically had a Ni:Co ratio of over 1000:1, but no methods of treating the basic cobalt sulphate precipitate were proposed in this patent. Canadian Patent No. 1,147,970 describes a similar approach. Precipitation of the basic cobalt (II) sulphate using ammonia was originally described in German Patent No. 595,688 in 1934.

A number of methods proposed for the separation of cobalt from nickel have been based on the differential solubilities of the ammine complexes of nickel (II) and cobalt (III). Such methods have been proposed, for example, in U.S. Pat. No. 2,728,636 to Van Hare; U.S. Pat. No. 3,227,513, to Alexa et al.; U.S. Pat. No. 3,967,957, to Fonseca and U.S. Pat. No. 4,208,380 to Hamalainen.

Prior art processes for the separate recovery of nickel and cobalt from sulphuric acid leach liquors are exemplified by South African Patent No. 75 00026. This patent describes a process in which a minor portion of the feed solution containing nickel and cobalt is neutralized with ammonium hydroxide to precipitate nickel (III) hydroxide using a strong oxidant, such as a hypochlorite or a persulphate to oxidize the nickel (II) hydroxide. This nickel (III) hydroxide is then used as a reagent to precipitate cobalt (III) hydroxide selectively from the major portion of the feed solution, to produce a nickel solution depleted in cobalt. The precipitate, which is a mixture of nickel (II) and cobalt (III) hydroxides, is further treated by redissolution in ammoniacal ammonium sulphate to form a solution containing nickel (II) and cobalt (III) pentammine sulphates, from which nickel is selectively precipitated as crystalline nickel ammonium sulphate, by acidifying the solution with sulphuric acid. The final traces of nickel are removed from the purified solution by ion exchange.

Kerfoot, in U.S. Pat. No. 5,468,281, broadly teaches a process for producing cobalt powder from nickel-cobalt sulphides which involves precipitating the triple salt of cobalt (III) hexammine sulphate, nickel (II) hexammine sulphate and ammonium sulphate. More specifically, the nickel-cobalt sulphides are pressure oxidation leached in an ammoniacal ammonium sulphate solution at a temperature of at least 80° C. at an effective ammonia to metals molar ratio ranging between 4:1 to 6.5:1 to oxidize the nickel and cobalt sulphides to sulphate thereby producing an ammoniacal leach liquor in which dissolved cobalt is predominantly in the (III) oxidation state, and a leach residue. The leach liquor is separated from the leach residue. The leach liquor is then combined with an effective amount of anhydrous ammonia and cooled to below 50° C. to thereby precipitate the triple salt comprising cobalt (III) hexammine sulphate, nickel (II) hexammine sulphate and ammonium sulphate. The leach liquor is passed to a nickel recovery circuit. The precipitated triple salt is recovered from the leach liquor and repulped with water to selectively leach nickel (II) hexammine sulphate and to produce a crystalline cobaltic (III) hexammine sulphate having a Co:Ni ratio of at least 100:1 and a nickel enriched leach liquor. The cobaltic (III) hexammine sulphate is recovered, dissolved in an ammonia/ammonium sulphate solution from which cobaltic (III) hexammine sulphate having a Co:Ni ratio of at least 1000:1 is recrystallized, which is subsequently treated to produce cobalt powder therefrom.

However, during the oxidative pressure leach, several other cobalt (III) ammonia complex ions can be formed in addition to the desired cobalt (III) hexammine sulphate. The term cobalt speciation is used in this application to refer to the formation and distribution of cobalt among these cobalt (III) ammonia complex ions. These other cobalt (III) ammonia species include cobalt (III) pentammine sulphite sulphate $[Co(NH_3)_5SO_3]_2(SO_4)$; cobalt (III) pentammine hydroxide sulphate $[Co(NH_3)_5OH](SO_4)$; and cobalt (III) hexammine nickel (II) hexammine ammonium sulphate triple salt $(NH_4)$ $[Co(NH_3)_6][Ni(NH_3)_6](SO_4)_3$. The contribution from cobalt (III) pentammine nitrite sulphate, a fourth cobalt complex formed in the leach is included in the cobalt pentammine hydroxide sulphate analysis.

One seeks to maximize the quantity of leached cobalt as the cobalt (III) hexammine sulphate in order to maximize the amount of the cobalt (III) hexammine nickel (II) hexammine ammonium sulphate triple salt formed during the selective precipitation thereof. This will not only improve the first pass recovery rate in the cobalt separation process thus reducing the cobalt content of the nickel product, but potentially also may lead to enhanced first pass nickel recovery.

SUMMARY OF THE INVENTION

It is a primary objective of the present invention to provide an improved hydrometallurgical process having enhanced cobalt recovery wherein the process involves the selective precipitation of the cobalt from an ammoniacal nickel-cobalt sulphide leach liquor solution and more specifically to the recovery of cobalt metal values from the leach residue.

More specifically, it is an objective of the present invention to provide an improvement particular to the process of U.S. Pat. No. 5,468,281, the disclosures of which are herein incorporated by reference. In this existing process, which is in current commercial operation, as stated previously, an important step in the production of cobalt powder from nickel-cobalt sulphides is to precipitate the triple salt of cobalt (III) hexammine sulphate, nickel (II) hexammine sulphate and ammonium sulphate. The nickel-cobalt sulphides are pressure oxidation leached in an ammoniacal ammonium sulphate solution at a temperature of at least 80° C. at an effective ammonia to metals molar ratio ranging between 5:1 to 6.5:1 to oxidize the nickel and cobalt sulphides to sulphate thereby producing an ammoniacal leach liquor in which dissolved cobalt is predominantly in the (III) oxidation state, and a leach residue. The leach liquor is separated from the leach residue. The leach liquor is then combined with an effective amount of anhydrous ammonia and cooled to below 50° C. to thereby precipitate the triple salt comprising cobalt (III) hexammine sulphate, nickel (II) hexammine sulphate and ammonium sulphate which is recovered by filtration. The leach liquor is passed to a nickel recovery circuit. The precipitated triple salt is recovered from the leach liquor and repulped with water to selectively leach nickel (II) hexammine sulphate and to produce a crystalline cobaltic (III) hexammine sulphate salt having a Co:Ni ratio of at least 100:1 and a nickel enriched leach liquor. The cobaltic (III) hexammine sulphate is recovered, dissolved in hot ammonium sulphate solution from which recrystallized cobaltic (III) hexammine sulphate is obtained upon cooling. The recrysallized salt having a Co:Ni ratio of at least 1000:1, is subsequently treated to produce cobalt powder therefrom.

The improvement to the above-described process resides in the discovery that the presence of an increased ammonia concentration in the oxidative pressure leach in combination with the use of higher temperatures will result in a change in cobalt (III) speciation with the formation of cobalt (III) hexammine sulphate being favoured. However, this maximization of cobalt (III) hexammine sulphate formation during the leach will take place mainly when the leach is completed and/or no leach residue is present. Thus, the improvement in the process contemplates a secondary oxidative pressure step conducted, preferably at higher temperatures and higher ammonia concentrations than the initial oxidative pressure leach, on the leach solution produced from this said initial or primary oxidative pressure leach. Typically, this secondary oxidative pressure treatment would be carried out following a polish filtration step of the oxidative pressure leach solution.

Broadly stated the invention comprises an improvement in a process for producing cobalt (III) hexammine sulphate, comprising leaching nickel cobalt sulphides in an ammoniacal ammonium sulphate solution under elevated pressure of an oxygen-bearing gas and at an elevated temperature with an effective ammonia to metals mole ratio to oxidize nickel and cobalt sulphides to sulphates, and to produce an ammoniacal leach liquor in which dissolved cobalt is predominantly in the (III) oxidation state, and a leach residue, ammoniating the leach liquor by combining it with an effective amount of ammonia and cooling the ammoniated leach liquor whereby the triple salt of cobalt (III) hexammine sulphate, nickel (II) hexammine sulphate and ammonium sulphate is precipitated, recovering the precipitated triple salt from the leach liquor, and repulping the triple salt with an effective amount of water to selectively leach nickel (II) hexammine sulphate and to produce a crystalline cobaltic (III) hexammine sulphate and a nickel enriched leach liquor, the improvement comprising: subjecting the essentially residue-free ammoniacal leach liquor obtained from the oxidative pressure leach to a secondary oxidative pressure treatment at elevated temperature in the presence of an oxygen-bearing gas with an ammonia to metals mole ratio effective to produce a leach liquor whereby the formation of cobalt (III) hexammine sulphate therein has been increased, thereby increasing the formation of the cobalt (III) hexammine sulphate containing triple salt during subsequent ammoniation of the leach liquor.

In a second broad aspect the invention extends to an improvement in a process for producing cobalt metal powder from nickel-cobalt sulphides comprising leaching said nickel-cobalt sulphides in an ammoniacal ammonium sulphate solution under an elevated pressure of an oxygen bearing gas, at a temperature of at least 80° C., with an effective ammonia to metals mole ratio in the range of 5:1 to 6.5:1 to oxidize the nickel and cobalt sulphides to sulphates, and to produce an ammoniacal leach liquor in which dissolved cobalt is predominantly in the (III) oxidation state, and a leach residue, separating the leach liquor from the leach residue, combining the leach liquor with an effective amount of ammonia and cooling the ammoniated leach liquor to below 50° C., whereby the triple salt of cobalt (III) hexammine sulphate, nickel (II) hexammine sulphate and ammonium sulphate is precipitated, recovering the precipitated triple salt from the leach liquor, repulping the triple salt with an effective amount of water to selectively leach nickel (II) hexammine sulphate and to produce a crystalline cobalt (III) hexammine sulphate with a Co:Ni ratio of at least 100:1 and a nickel enriched leach liquor, redissolving the cobalt (III) hexammine sulphate in hot ammonium sulphate solution, and cooling the solution to precipitate recrystallized cobalt (III) hexammine sulphate having a Co:Ni ratio of at least about 1000:1 and treating the recrystallized cobalt (III) hexammine sulphate to produce cobalt metal therefrom, the improvement comprising: subjecting the essentially residue-free ammoniacal leach liquor obtained from the oxidative pressure leach to a secondary oxidative pressure treatment at elevated temperature and elevated pressure of an oxygen-bearing gas with an effective ammonia to metals mole ratio to produce a leach liquor whereby the formation of cobalt (III) hexammine sulphate therein has been increased.

Preferably, the secondary oxidative pressure treatment would be conducted at temperatures ranging between 110 to 150° C. and titratable ammonia concentrations ranging between 120 to 200 g/L. The pressure of the secondary oxidative treatment step can be low, sufficient to maintain oxidative condition, and either air or oxygen can be used. Additionally, the process contemplates a polish filtration step to be conducted between the oxidative pressure leach and the secondary oxidative pressure treatment.

DESCRIPTION OF THE PREFERRED EMBODIMENT

Figure 1:
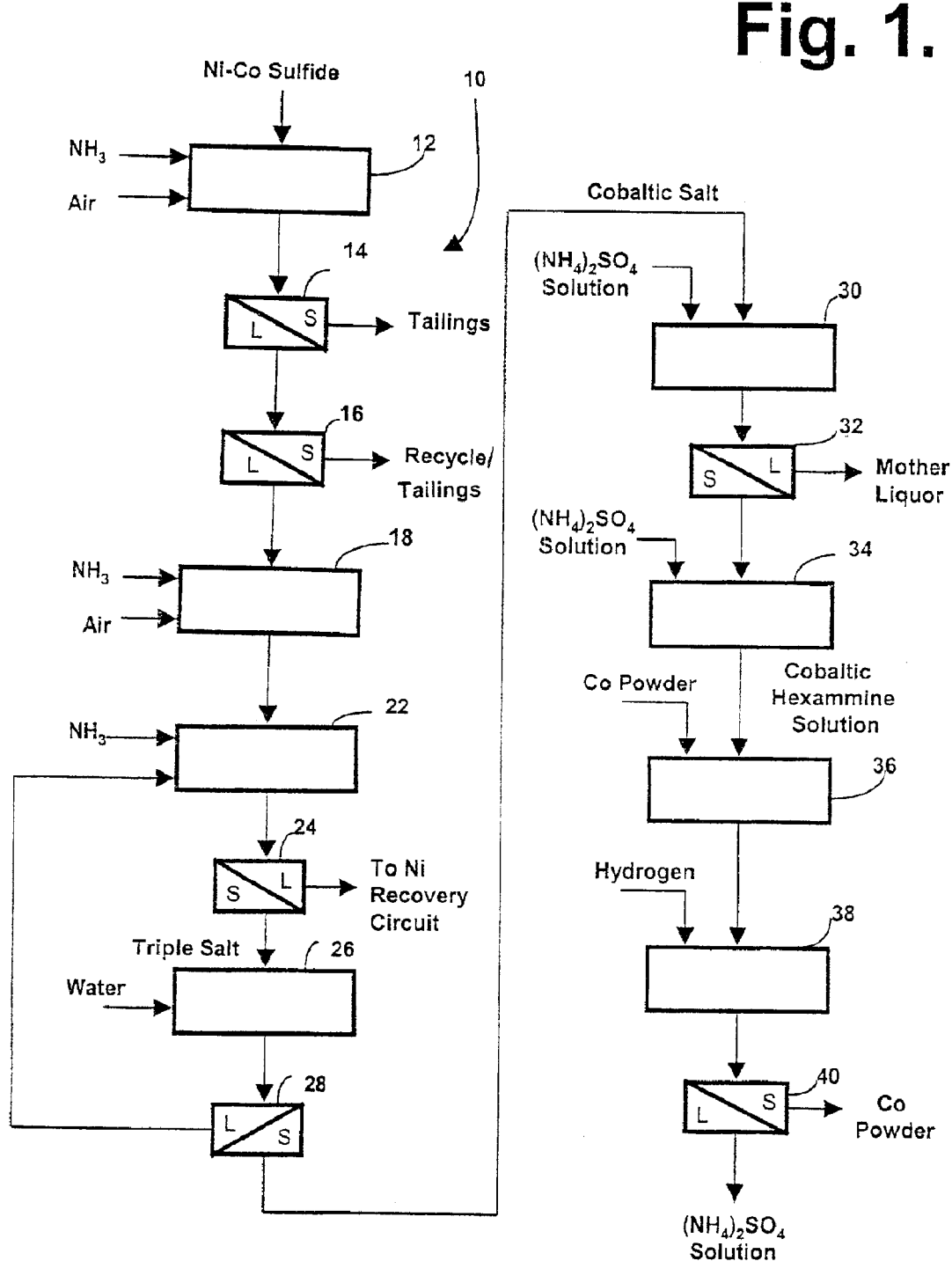
FIG. 1 is a schematic flowsheet of a preferred embodiment of the process.

Having reference to the schematic flowsheet 10 of FIG. 1, mixed nickel-cobalt sulphides in a finely divided state are first pressure leached in a conventional ammoniacal ammonium sulphate pressure leach 12, under elevated air pressure of at least 500 kPa, at a temperature of at least 80° C., to oxidize the nickel and cobalt sulphides to the corresponding sulphates. The ammonium sulphate concentration is maintained in the range 150 to 250 g/L and the titratable ammonia concentration is adjusted to maintain the titratable ammonia to divalent metal mole ratio in the range 5:1 to 6.5:1, preferably at about 6:1, to maximize the formation of the hexammine complex ions of nickel (II) and cobalt (III). The leach solution produced will typically contain from 40 to 110 g/L nickel and from 4 to 20 g/L cobalt.

After liquid-solid separation 14 of the ammoniacal pressure leach product slurry 12, the solid residue is passed to tailings for disposal.

The leach liquor from the ammoniacal pressure leach 12 is then passed to a polish filtration step 16 to ensure complete removal of trace residue particles, and then passed to a secondary oxidative pressure autoclave 18 where a further oxidative treatment is conducted under elevated over pressure of air of at least 100 kPa, at a temperature of at least 110° C. and an ammonia concentration ranging between 120 g/L to 200 g/L to thereby maximize the conversion of cobalt (III) species to the cobalt (III) hexammine sulphate. When using air or oxygen as the oxidant, the vapour phase may be flammable under the process conditions.

The leach liquor from the secondary oxidative pressure step 18 is combined with ammonia to increase the titratable ammonia concentration to the range 170 to 210 g/L, and cooled to below 50° C., in the triple salt precipitation step 22.

Under these conditions a crystalline triple salt, containing cobalt (III) hexammine sulphate, nickel (II) hexammine sulphate, and ammonium sulphate, with a Co:Ni ratio of about 1:1 is precipitated, typically leaving about 2 g/L Co with 30 to 100 g/L Ni in solution. Following liquid/solid separation step 24, this solution is passed to the nickel recovery circuit for treatment by prior art processes, to produce nickel powder meeting market specifications for cobalt content. The residual cobalt in the nickel solution is passed through the nickel powder reduction step, and is precipitated with hydrogen sulphide as a nickel-cobalt sulphide with a Ni:Co ratio of about 1:1 in a subsequent sulphide precipitation step, not shown. This sulphide is recycled as feed to the oxidative pressure leach 12.

The triple salt, which is recovered by filtration (in step 24) from the cooled liquor, is repulped with a controlled amount of mother liquor (from step 32), and is leached with water at about 20° C., in water leach 26 to selectively leach nickel hexammine sulphate, as well as other trace metals such as copper, zinc and cadmium, to produce a crystalline cobaltic hexammine sulphate, with a Co:Ni ratio of 100:1 or higher. The leach liquor which typically contains 50 to 65 g/L Ni and 10 to 15 g/LCo with 100 to 120 g/L titratable $NH_3$, is recycled to the triple salt precipitation step 22 where most of the cobalt is reprecipitated, and the soluble nickel is returned to the nickel recovery circuit (not shown).

The cobaltic hexammine sulphate is recovered by liquid solid separation 28 and is further upgraded by recrystallization in step 30 wherein the salt is dissolved in hot ammonium sulphate solution and is reprecipitated by cooling to yield a cobaltic hexammine sulphate product with a Co:Ni ratio of 1000:1 or higher. The mother liquor is recycled to repulp the triple salt (26) and the purified cobalt salt forms the feed for the production of cobalt metal or cobalt chemicals, using known prior art processes. For the production of cobalt powder by hydrogen reduction, for example, the purified salt is recovered by liquid-solid separation 32 and redissolved in hot ammonium sulphate solution (from step 40) in redissolution step 34, and is then treated with cobalt powder to reduce Co(III) to Co(II), and treated with sulphuric acid to adjust the ammonia:cobalt mole ratio to about 2:1, in conversion step 36. This solution then forms the feed to the cobalt reduction step 38, in which cobalt powder is produced using hydrogen at elevated temperature and pressure, and is separated from the ammonium sulphate solution by liquid-solid separation 40. Alternatively, the purified cobalt (III) hexammine sulphate can be pyrolysed to cobalt (II) sulphate, or cobalt oxides.

The process of the invention is further illustrated having reference to the following non-limitative examples. The following examples, namely I to III, were conducted in a 3.8 L stainless steel autoclave. In each test, solids from a nickel-cobalt sulphide refinery feed slurry were used as feed. The leaches were conducted at temperatures of 95° C. under 140 kPa oxygen overpressure using a 2.5 L charge volume. The leach slurry samples were filtered and the solids washed with 50 g/L $NH_3$/100 g/L $(NH_4)_2SO_4$ solution and then filtered and displacement washed with warm water to dissolve prematurely precipitated triple salt. The final slurry was cooled to between 50 and 60° C., discharged from the autoclave and filtered. Solids were dried at 90° C. and analysed.

Although cobalt (III) hexammine ion (Co-hex) concentrations will be increased by modifying the conditions of the initial oxidative leach (Examples I and III), the best and most consistent results were obtained by treatment of filtered leach solution in a separate oxidative process (Example II).

The following abbreviations are utilized in the examples and tables as follows: cobalt (III) hexammine ion (Co-hex); cobalt (III) pentammine sulphite ion (Co—$SO_3$); cobalt (III) pentammine hydroxide ion (Co—OH) and cobalt pentammine nitrite ion (Co—$NO_2$).

EXAMPLE I

This example demonstrates the primary ammoniacal ammonium sulphate leaching of nickel-cobalt sulphides at high metals and ammonia concentrations. The results of leaching of sulphides to completion at high ammonia/high nickel metal concentrations are given in Table I herebelow.

Premature triple salt precipitation from the leach discharge slurry can be minimized if the leach solutions are diluted after leaching to an ammonia concentration of 150 g/L. Dilution of the leach slurry will not alter the cobalt speciation in solution. In each test approximately 85% of the leached cobalt was present in the product solution as the cobalt (III) hexammine sulphate, compared to typically 75–80% under normal operating conditions.

TABLE I

| Solution Component | | Test 1 | | | Test 2 | |
|---|---|---|---|---|---|---|
| | | Leach Solution | | | Leach Solution | |
| g/L | Target | Undiluted | Diluted | Target | Undiluted | Diluted |
| Ni | 130 | 120 | 103 | 145 | 118 | 112 |
| Co | 18 | 6.0** | 14.6 | 20 | 9.5** | 15.7 |
| $NH_3f$ | 180 | 178 | 157 | 190 | 162 | 147 |
| $(NH_4)_2SO_4$ | 200 | 167 | 124 | 200 | 202 | 147 |
| Co-hex, %* | — | 86.6 | 84.2 | — | 83.2 | 85.9 |

*refers to the portion of the cobalt present as cobalt (III) hexammine ion
**low cobalt concentrations in undiluted solution indicates the precipitation of the triple salt.

Results from the subsequent ammoniation of the diluted leach solution from leach tests 1 and 2 are summarized herebelow in Table II. It was found that cobalt precipitation as the triple salt (upon ammoniation) greater than 80% was attained using the above leach solutions having improved cobalt speciation.

TABLE II

| Solution Component | Test 1 | | Test 2 | |
|---|---|---|---|---|
| g/L | Feed Solution | Filtrate | Feed Solution | Filtrate |
| Ni | 105 | 85.8 | 112 | 90.4 |
| Co | 14.0 | 2.46 | 15.9 | 2.32 |
| Ni:Co ratio | 7.5 | 35 | 7.0 | 40 |
| $(NH_4)_2SO_4$ | 169 | 140 | 145 | 132 |
| $NH_3f$ | 156 | 208 | 146 | 216 |

EXAMPLE II

This example is provided to demonstrate the effect of elevated temperature on the conversion of the cobaltic pentammine species to cobaltic hexammine sulphates in the feed solution to the triple salt precipitation step. These secondary oxidative tests were conducted on filtered leach solutions obtained from the initial oxidative pressure leach. The tests were conducted by heating the leach solutions under an oxygen overpressure of about 140 kPa at temperatures ranging between 105 to 120° C. and with ammonia concentrations ranging from 144 to 199 g/L. Feed solutions to these tests were ammoniated before being charged to the autoclave. The results are given in Table III below. Cobalt (III) hexammine of up to 98% of the total cobalt in solution was obtained.

TABLE III

| Process Conditions | | Cobalt Speciation, %, (after 60 min) | | |
|---|---|---|---|---|
| Temperature, ° C. | $NH_3f$, g/L | Co-Hex | Co—$SO_3$ | Co—OH |
| 105 | 199 | 89.6 | 2.9 | 7.5 |
| 120 | 198 | 98.7 | 0.0 | 1.3 |

TABLE III-continued

| Process Conditions | | Cobalt Speciation, %, (after 60 min) | | |
|---|---|---|---|---|
| Temperature, °C. | NH₃f, g/L | Co-Hex | Co—SO₃ | Co—OH |
| 120 | 170 | 96.5 | 0.1 | 3.4 |
| 120 | 144 | 96.4 | 0.1 | 3.5 |

EXAMPLE III

This example is provided to demonstrate the combined effects of high temperature and increased ammonia concentration on cobalt speciation during the primary oxidative pressure leaching of nickel-cobalt sulphides. Batch leach tests were conducted in a 3.8 L titanium autoclave using a nickel-cobalt sulphide feed slurry. The charge to the autoclave consisted of 405 g (dry basis) nickel-cobalt sulphides solids to give 90 g/L Ni, 500 g of ammonium sulphate, the requisite amount of ammonia as ammonium hydroxide and water to make a total volume to 2.5 L. The oxidative pressure leach was conducted at 95° C. for the first 3 hours and at an increased temperature of 120° C. for the next 2 hours at an oxygen overpressure of 140 kPa. The results are given in Table IV herebelow and demonstrate the benefits of increased temperature and ammonia concentrations.

TABLE IV

| | Test No. | | | | | |
|---|---|---|---|---|---|---|
| | 1 | | 2 | | 3 | |
| Leach Time, h | 3 | 5 | 3 | 5 | 3 | 5 |
| Leach Temp. °C. | 95 | 120 | 95 | 120 | 95 | 120 |
| Solution, g/L | | | | | | |
| NH₃f | 124 | 115 | 132 | 125 | 150 | 144 |
| Nickel | 89.6 | 94.2 | 93.6 | 98.2 | 91.2 | 97.4 |
| Cobalt | 11.5 | 11.8 | 11.8 | 12.0 | 11.7 | 11.5 |
| Co Speciation, % | | | | | | |
| Co-Hex | 66 | 73 | 64 | 79 | 68 | 84 |
| Co—OH | 7 | 15 | 10 | 11 | 9 | 6 |
| Co—SO₃ | 23 | 0 | 21 | 0 | 20 | 1 |
| Co—NO₂ | 4 | 12 | 5 | 10 | 4 | 9 |
| Extraction % | | | | | | |
| Nickel | 93.5 | 99.8 | 96.3 | 99.8 | 97.1 | 99.9 |
| Cobalt | 94.1 | 99.4 | 96.6 | 99.7 | 97.5 | 99.9 |

EXAMPLE IV

Miniplant Operation

The circuit procedures and results of a continuous miniplant run are outlined herebelow. The cobaltic hexammine leach solution obtained from the primary autoclave oxidative pressure leach of the commercial plant (an average analysis of said feed solution comprising: Ni 95 g/L; Co 12.2 g/L; (Co as hexammine sulphate 9.97 g/L); Cu 0.86 g/L; Zn 3.6 g/L; NH₃ 120 g/L; (NH₄)₂SO₄ 157 g/L) was contacted in the miniplant autoclave with anhydrous ammonia and compressed air, under elevated temperature and pressure. The objective of this second oxidative pressure treatment was to convert the residual cobaltic pentammines contained in the solution obtained from the primary oxidative pressure leach to the cobaltic hexammine ion, whereby a maximization of the soluble cobalt recoverable as the cobalt(III) hexammine nickel(II) hexammine ammonium sulphate triple salt using the conventional precipitation process was achieved.

Figure 2:
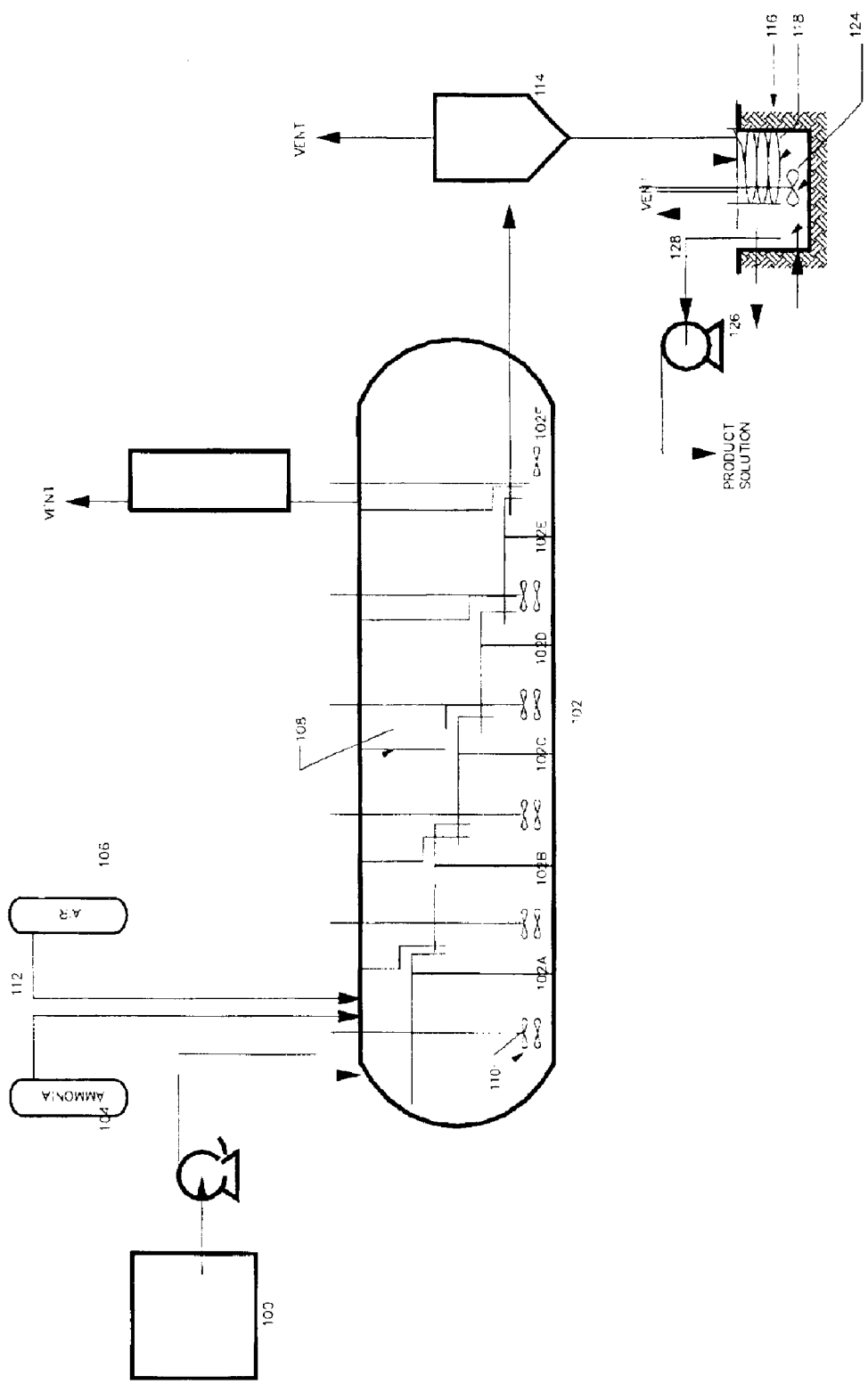
FIG. 2 is a schematic diagram of a miniplant autoclave circuit used to demonstrate the viability of the improved process.

Having reference to FIG. 2, the primary oxidative pressure leach solution was fed to the miniplant autoclave from a scale-mounted feed tank 100. During normal operation, the feed tank 100 was kept covered.

Solution was continuously pumped from the feed tank 100 into the first compartment 102a of the horizontal stainless steel autoclave 102. Anhydrous ammonia was admitted separately to the first compartment 102a of the autoclave from a cylinder 104. Additionally, compressed air from a cylinder 106 was added to the first compartment 102a of the secondary oxidative pressure treatment autoclave 102. The continuous autoclave 102 was operated in a six compartment mode designated from feed to discharge end as 102a through 102f respectively. Downcorner dividers 108 were utilized to separate the compartments. Each compartment was provided with an agitator 110 equipped with axial over radial impellers operated at 1300 rev/min. The autoclave gas phase was continuously vented from the final compartment, 102f, to thereby ensure a positive net flow of air through the autoclave throughout the test. Air was added to all compartments except 102f through spargers (not shown) located below the agitators and flow rates were determined using a mass flow meter and rotameters.

Pressurized anhydrous ammonia from cylinder 104 was delivered to the autoclave through a rotameter 112 to measure the flow, the addition rate being also monitored by determination of weight loss from the cylinder which was mounted on a balance (not shown). Following passage through rotameter 112, the ammonia, which up to this point was liquid, was passed through a coil, submerged in hot water to promote evaporative flashing of the ammonia into the autoclave 102.

Solution from the autoclave 102 was discharged at regular intervals, typically every 60 to 120 seconds, through a cyclone 114 into a pressure letdown vessel 116, namely a three gallon vertical autoclave. The vent gases from the cyclone overflow were directed through a cooling coil en route to an acidic scrubber (not shown). Solution entered the pressure letdown vessel 116 from the cyclone underflow. The autoclave discharge cycle time was adjusted to minimize the amount of vapour discharged with the solution. In the letdown vessel 116 the solution was continuously cooled with water via an internal cooling coil 118. The target temperature inside the letdown vessel was 40° C. The letdown vessel 116 was vented directly to the atmosphere to maintain atmospheric pressure therein. The letdown vessel 116 was further equipped with baffles 122 and a single axial impeller 124 rotating at 430 rev/min. Product solution was discharged via a peristaltic pump 126 through a dip pipe 128. The discharge pump 126 was operated on demand to maintain a constant level within the letdown vessel 116. Product solution was collected for further processing.

The effects of temperature and ammonia concentrations on cobalt speciation in the secondary oxidative pressure step are shown in Table V below:

TABLE V

| | Temperature, °C. | | | |
|---|---|---|---|---|
| | 130 | 140 | 140 | 150 |
| NH₃f, g/L | 151 | 144 | 192 | 144 |
| Co-Hex at Completion of Treatment, % | 93.7 | 94.2 | 96.5 | 93.7 |
| Retention Time Required, min. | 37 | 22 | 24 | 23 |

It will be understood that other embodiments and examples of the invention will be readily apparent to a person skilled in the art, the scope of the invention being defined in the appended claims.

We claim:
1. In a process for producing cobalt (III) hexammine sulphate, comprising leaching nickel-cobalt sulphides in a primary oxidative pressure leach in an ammoniacal ammonium sulphate solution under elevated pressure of an oxygen-bearing gas and at an elevated temperature with an ammonia to metals mole ratio effective to oxidize nickel and cobalt sulphides to sulphates, and to produce an ammoniacal leach liquor in which dissolved cobalt is predominantly in the (III) oxidation state, and a leach residue, separating the leach liquor from the leach residue and ammoniating the leach liquor by combining it with an effective amount of ammonia and cooling the ammoniated leach liquor whereby the triple salt of cobalt (III) hexammine sulphate, nickel (II) hexammine sulphate and ammonium sulphate is precipitated, recovering the precipitated triple salt from the leach liquor, and repulping the triple salt with an effective amount of water to selectively leach nickel (II) hexammine sulphate and to produce a crystalline cobalt (III) hexammine sulphate and a nickel enriched leach liquor, the improvement comprising: subjecting the leach liquor obtained from the primary oxidative pressure leach to a secondary oxidative pressure treatment at elevated temperature in the presence of an oxygen-bearing gas with an ammonia to metals mole ratio effective to produce a leach liquor whereby the formation of cobalt (III) hexammine sulphate therein has been increased.

2. The process as set forth in claim 1 wherein the temperature of said secondary oxidative pressure treatment ranges between 110 to 150° C.

3. The process as set forth in claim 1 wherein the concentration of titratable ammonia in said secondary oxidative pressure treatment ranges between 120 to 200 g/L.

4. The process as set forth in claim 1 wherein the concentration of titratable ammonia ranges between 120 and 200 g/L and the temperature ranges between 110 to 150° C. in said secondary oxidative pressure treatment.

5. The process as set forth in claim 4 wherein the nickel enriched leach liquor from the primary oxidative pressure leach step is subjected to a polish filtration.

* * * * *